(12) United States Patent
Army (10) Patent No.: US 11,780,592 B2
(45) Date of Patent: Oct. 10, 2023

(54) ENVIRONMENTAL CONTROL SYSTEM PACK

(71) Applicant: Hamilton Sundstrand Corporation, Charlotte, NC (US)

(72) Inventor: Donald E. Army, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 96 days.

(21) Appl. No.: 17/388,590

(22) Filed: Jul. 29, 2021

(65) Prior Publication Data
US 2022/0033088 A1 Feb. 3, 2022

Related U.S. Application Data

(60) Provisional application No. 63/196,504, filed on Jun. 3, 2021, provisional application No. 63/058,034, filed on Jul. 29, 2020.

(51) Int. Cl.
*B64D 13/00* (2006.01)
*B64D 13/06* (2006.01)
*B64D 13/08* (2006.01)

(52) U.S. Cl.
CPC .............. *B64D 13/06* (2013.01); *B64D 13/08* (2013.01); *B64D 2013/0618* (2013.01); *B64D 2013/0662* (2013.01); *B64D 2013/0674* (2013.01)

(58) Field of Classification Search
CPC .............. B64D 13/06; B64D 13/08; B64D 2013/0618; B64D 2013/0662; B64D 2013/0674; Y02T 50/50; F28D 2021/0026
See application file for complete search history.

(56) References Cited

U.S. PATENT DOCUMENTS

| | | | | |
|---|---|---|---|---|
| 3,208,234 A | * | 9/1965 | Messinger | B64D 13/06 165/145 |
| 6,460,353 B2 | * | 10/2002 | Udobot | F28D 9/0062 62/275 |
| 9,452,840 B2 | | 9/2016 | Lyons et al. | |
| 10,562,636 B2 | | 2/2020 | Peacos, III et al. | |
| 2001/0025506 A1 | | 10/2001 | Buchholz et al. | |
| 2002/0121103 A1 | * | 9/2002 | Udobot | F28F 19/006 62/93 |

(Continued)

FOREIGN PATENT DOCUMENTS

| GB | 768975 A | 2/1957 |
|---|---|---|
| GB | 996166 | 6/1965 |

OTHER PUBLICATIONS

European Search Report; European Application No. 21188600.7; dated Apr. 13, 2022; 12 pages.

(Continued)

*Primary Examiner* — Jacob M Amick
*Assistant Examiner* — Sherman D Manley
(74) *Attorney, Agent, or Firm* — CANTOR COLBURN LLP (57) ABSTRACT

An environmental control system is provided including a ram air circuit having a ram air duct and at least one heat exchanger arranged within the ram air duct. The ram air duct is curved about a ram axis. A compression device includes a compressor and at least one turbine operably coupled by a shaft rotatable about a shaft axis. The ram axis is arranged coaxially with the shaft axis.

19 Claims, 9 Drawing Sheets

(56) References Cited

U.S. PATENT DOCUMENTS

| | | | |
|---|---|---|---|
| 2011/0073716 A1* | 3/2011 | Klimpel | B64D 13/00 244/53 B |
| 2011/0259546 A1* | 10/2011 | DeFrancesco | B64D 13/00 137/861 |
| 2013/0097996 A1 | 4/2013 | Rosen et al. | |
| 2017/0159565 A1 | 6/2017 | Evulet | |
| 2017/0233083 A1 | 8/2017 | Behrens et al. | |
| 2018/0291925 A1* | 10/2018 | Chrabascz | B64D 13/08 |
| 2018/0354626 A1* | 12/2018 | Himmelmann | B64D 13/06 |
| 2020/0108937 A1 | 4/2020 | Behrens et al. | |
| 2020/0172252 A1* | 6/2020 | Beckman | B64F 5/30 |
| 2022/0194600 A1* | 6/2022 | Army | B64D 13/04 |
| 2022/0381521 A1* | 12/2022 | Heminger | B33Y 80/00 |

OTHER PUBLICATIONS

European Partial Search Report; European Application No. 21188600.7; dated Dec. 20, 2021; 13 pages.

* cited by examiner

ENVIRONMENTAL CONTROL SYSTEM PACK

CROSS-REFERENCE TO RELATED APPLICATIONS

This application claims priority to U.S. Provisional Application No. 63/196,504, filed Jun. 3, 2021 and U.S. Provisional Application No. 63/058,034, filed Jul. 29, 2020 the disclosures of which are incorporated by reference herein in their entirety.

BACKGROUND

Embodiments of the disclosure relate to environmental control systems, and more specifically to an environmental control system of an aircraft.

Commercial aircraft typically use an environmental control system to pressurize a cabin of the aircraft and/or to provide heated air for anti-icing applications. Air supply to these systems is typically provided by bleed air extracted from or provided by a compressor or an aircraft engine. Within the environmental control system, the air is conditioned to a desired temperature, pressure, and humidity selected based on the receiving load of the aircraft.

It should be appreciated that while the environmental control system is necessary for operation of the aircraft, the overall size, weight, and complexity of the system may have a less than desirable impact on the fuel performance and carrying capacity of the aircraft. Accordingly, while existing environmental control systems are suitable for their intended purposes the need for improvement remains, particularly in providing a lower system weight and volume.

BRIEF DESCRIPTION

According to an embodiment, an environmental control system is provided including a ram air circuit having a ram air duct and at least one heat exchanger arranged within the ram air duct. The ram air duct is curved about a ram axis. A compression device includes a compressor and at least one turbine operably coupled by a shaft rotatable about a shaft axis. The ram axis is arranged coaxially with the shaft axis.

In addition to one or more of the features described above, or as an alternative, in further embodiments the ram air duct has a scroll-shaped outer wall that is curved about the ram axis.

In addition to one or more of the features described above, or as an alternative, in further embodiments a portion of the ram air duct is directly connected to the compression device.

In addition to one or more of the features described above, or as an alternative, in further embodiments the ram air circuit further comprises a diffuser/ejector arranged within the ram air duct, wherein a plenum is defined between an exterior of the diffuser/ejector and an interior of the ram air duct and the at least one heat exchanger is arranged within the plenum.

In addition to one or more of the features described above, or as an alternative, in further embodiments the diffuser/ejector extends external to the ram air duct.

In addition to one or more of the features described above, or as an alternative, in further embodiments the at least one heat exchanger extends external to the ram air duct.

In addition to one or more of the features described above, or as an alternative, in further embodiments a diameter of the diffuser/ejector increases along a fluid flow path defined by an interior of the ejector.

In addition to one or more of the features described above, or as an alternative, in further embodiments the at least one heat exchanger is mounted concentrically about at least a portion of the ejector.

In addition to one or more of the features described above, or as an alternative, in further embodiments a radial clearance between the diffuser/ejector and the at least one heat exchanger varies over an axial length of the ejector.

In addition to one or more of the features described above, or as an alternative, in further embodiments the environmental control system further comprises a fan fluidly coupled to the plenum and to the ejector.

In addition to one or more of the features described above, or as an alternative, in further embodiments the fan is mounted to the shaft of the compression device.

In addition to one or more of the features described above, or as an alternative, in further embodiments the compression device includes a housing, an end of the housing being connectable to the ram air circuit such that a portion of the housing surrounding the fan defines a turnabout section fluidly connecting the plenum and the fan.

In addition to one or more of the features described above, or as an alternative, in further embodiments the housing includes a shroud surrounding the fan, the shroud being connectable to an end of the ejector.

In addition to one or more of the features described above, or as an alternative, in further embodiments comprising a dehumidification system including a condenser and a water collector.

In addition to one or more of the features described above, or as an alternative, in further embodiments a portion of the dehumidification system is mounted concentrically about the compression device.

In addition to one or more of the features described above, or as an alternative, in further embodiments the portion of the dehumidification system is integrally formed with the compression device.

According to another embodiment, an environmental control system is provided including a first module and a second module. The first module includes an inlet and a ram air circuit, the first module being oriented about a first axis. The second module includes an outlet and a compression device, the second module defining a second axis. The first module and the second module are connectable to define a fluid flow path extending between the inlet and the outlet. When the first module and the second module are connected, the first axis and the second axis are coaxial.

In addition to one or more of the features described above, or as an alternative, in further embodiments the second module further includes a dehumidification system.

In addition to one or more of the features described above, or as an alternative, in further embodiments at least a portion of the dehumidification system is mounted concentrically about the compression device.

In addition to one or more of the features described above, or as an alternative, in further embodiments the ram air circuit includes a heat exchanger, and an outer diameter of the second module is generally equal to or less than an inner diameter of the heat exchanger.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments herein provide an environmental control system of an aircraft that uses at least one energy source to power the environmental control system and to provide cabin pressurization and cooling at high fuel burn efficiency. The one or more mediums disclosed herein may be air, although other examples of suitable mediums include gases, liquids, fluidized solids, or slurries.

With reference now to the Figures, various views of an environmental control system (ECS) 20, such as an air conditioning unit or pack for example, is depicted according to non-limiting embodiments. Although the environmental control system 20 is described with reference to an aircraft, alternative applications are also within the scope of the disclosure. As shown in the figures, the environmental control system 20 can receive a medium A at an inlet 22. In embodiments where the environmental control system 20 is used in an aircraft application, the medium A may be bleed air, which is pressurized air originating from, i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn. In the illustrated, non-limiting embodiment, the inlet 22 of the environmental control system 20 is operably coupled to a volume 24, such as the cabin of the aircraft for example. In such embodiments, a conditioned formed of the medium is provided to the volume via an outlet 26 of the environmental control system 20.

The environmental control system 20 includes a ram air circuit 30. The ram air circuit 30 includes a shell or duct 32 within which at least one heat exchanger, also referred to as a ram air heat exchanger, may be located. The shell 32 can receive and direct a medium, such as ram air for example, through a portion of the environmental control system 20. The one or more heat exchangers are devices built for efficient heat transfer from one medium to another. Examples of heat exchangers include double pipe, shell and tube, plate, plate and shell, adiabatic wheel, plate fin, pillow plate, and fluid heat exchangers. At the one or more heat exchangers, ram air or outside air for example, acts as a heat sink to cool a medium passing there through.

In the illustrated, non-limiting embodiment, the ram air duct 32 includes an outer wall 34 having a scroll-shaped length that extends from a first edge 36 to a second, opposite edge 38. A first axis or ram axis may be defined by the curvature of the scroll-shaped outer wall 34. The first edge 36 and the second edge 38 define opposite sides of an inlet opening 40 of the ram air duct 32. Although the inlet opening 40 is illustrated as being generally rectangular in shape, embodiments where the inlet opening 40 is another shape are also contemplated herein. The ram air duct 32 additionally includes a first sidewall 42 and a second sidewall 44. Although the sidewalls 42, 44 are shown as having a generally planar configuration, embodiments where the sidewalls 42, 44 have another configuration, such as a curvature formed therein for example, are also contemplated herein.

Figure 1:
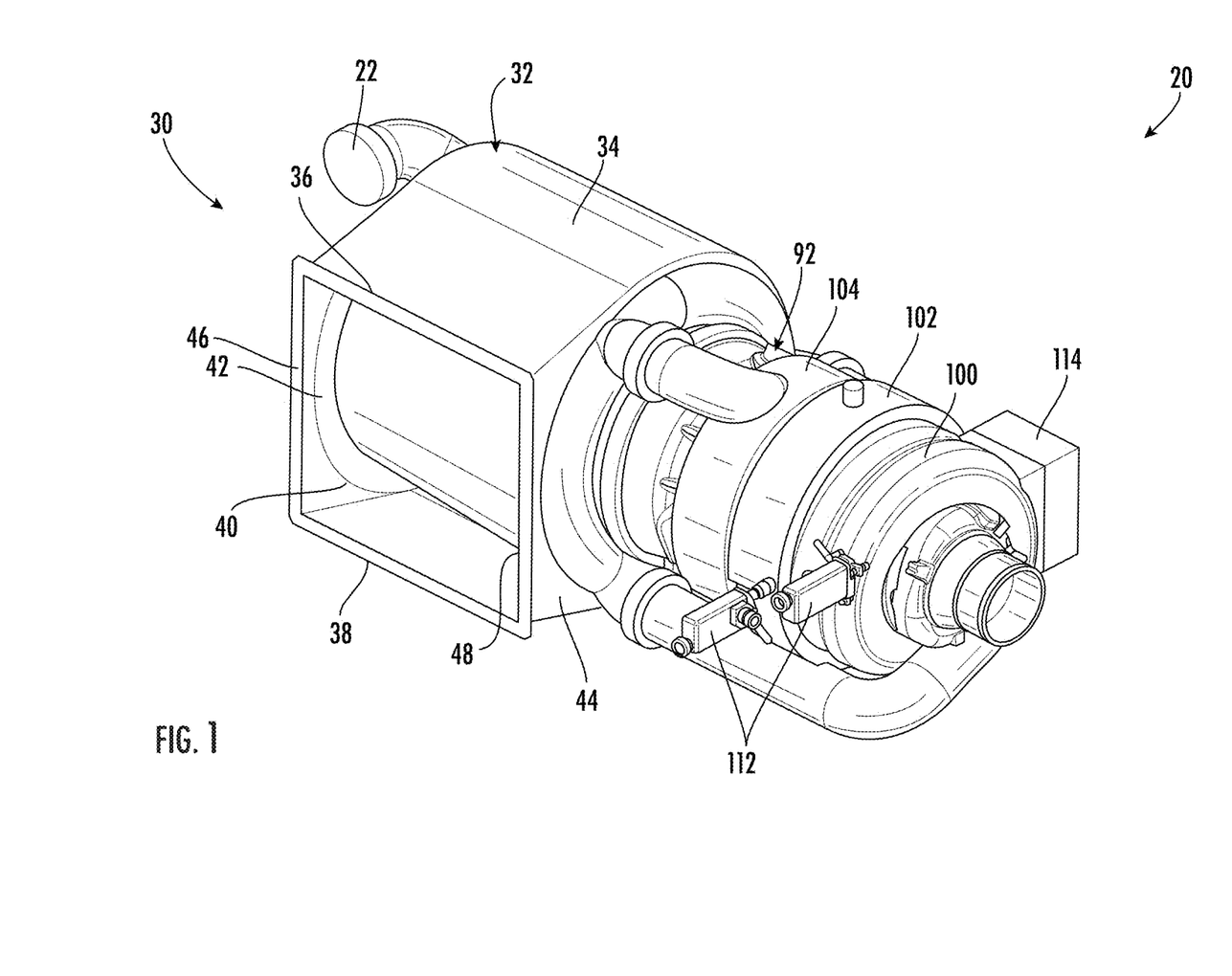
FIG. 1 is a front perspective view of an environmental control system according to an embodiment.
Figure 2:
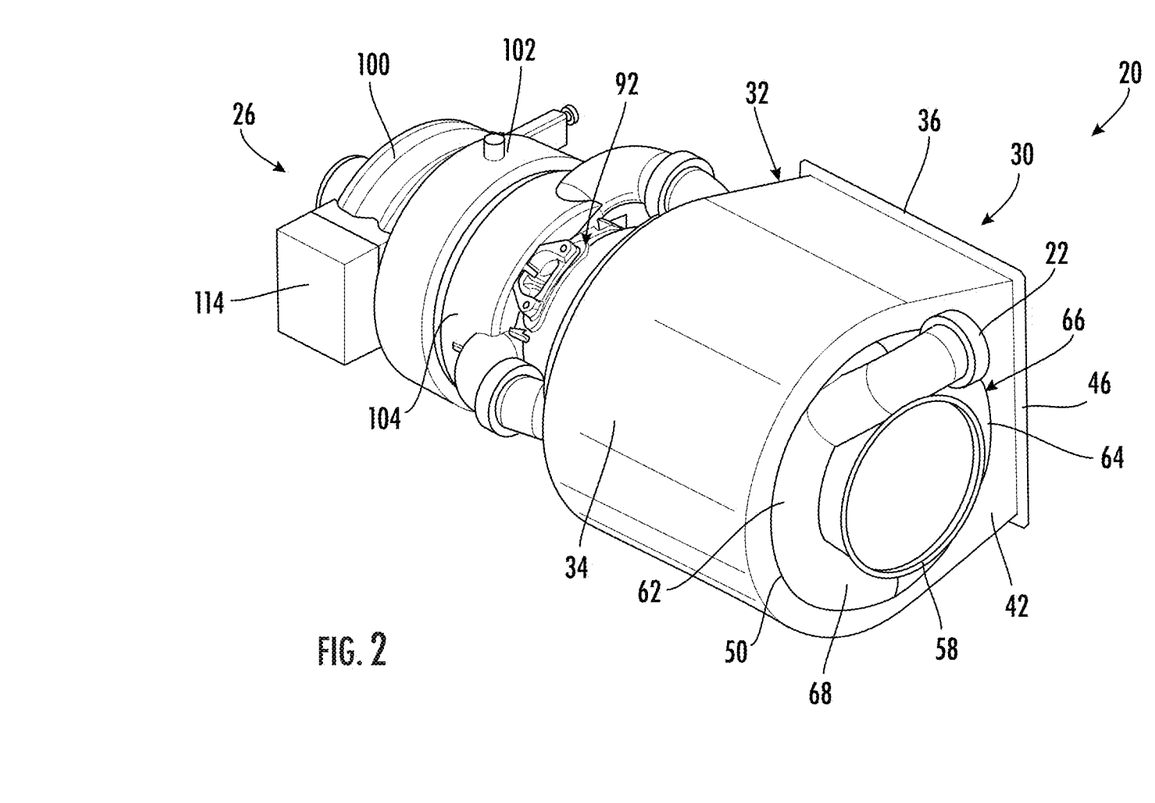
FIG. 2 is a rear perspective view of the environmental control system of FIG. 1 according to an embodiment.
Figure 3:
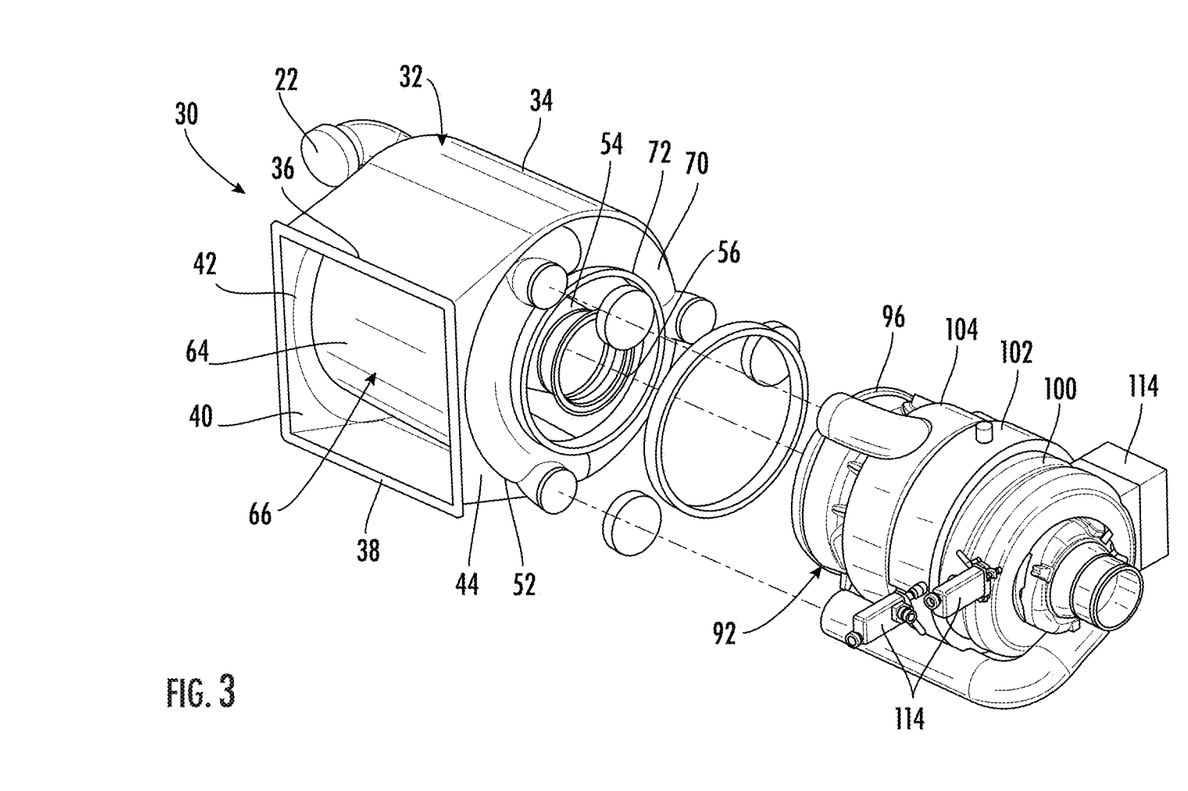
FIG. 3 is a partially exploded front perspective view of the environmental control system of FIG. 1 according to an embodiment.
Figure 4:
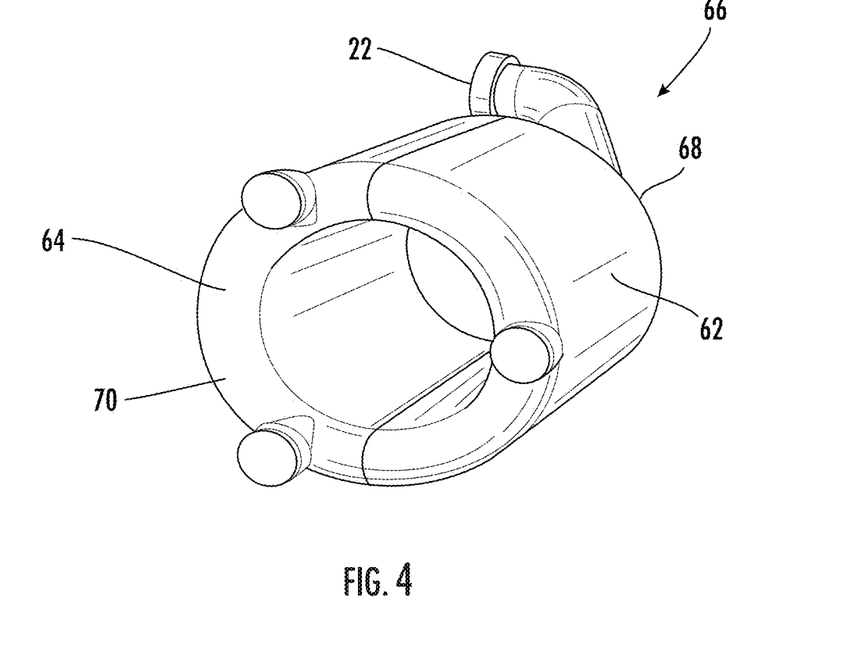
FIG. 4 is a perspective view of a heat exchanger assembly of an environmental control system according to an embodiment.
Figure 5:
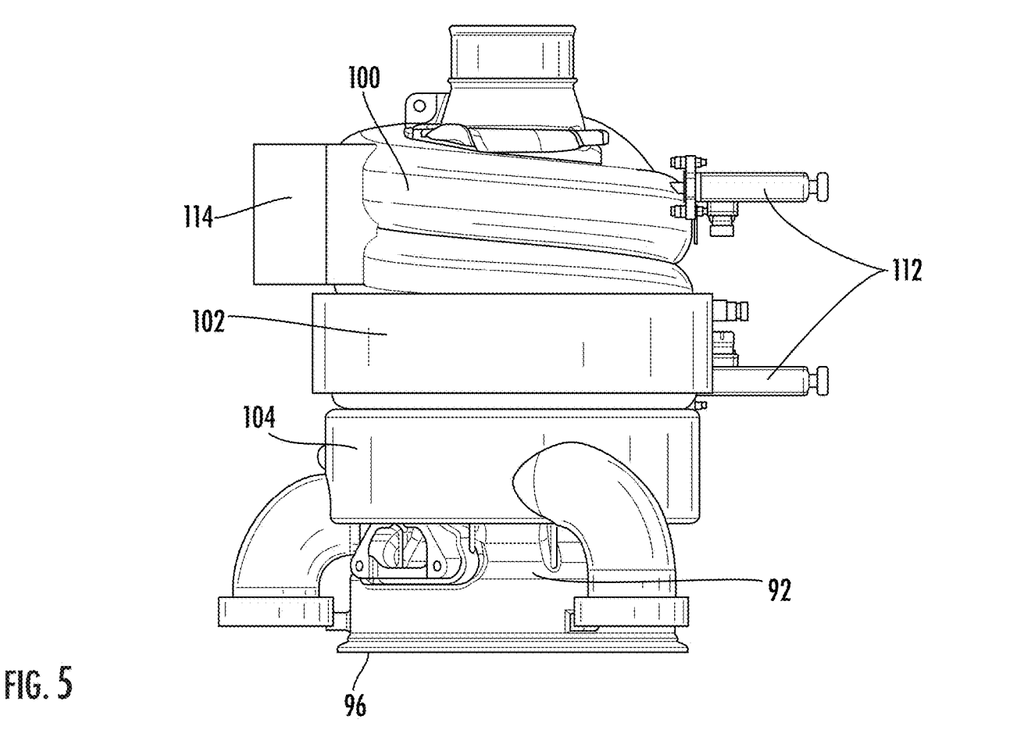
FIG. 5 is a plan view of a portion of the environmental control system of FIG. 1 according to an embodiment.
Figure 8:
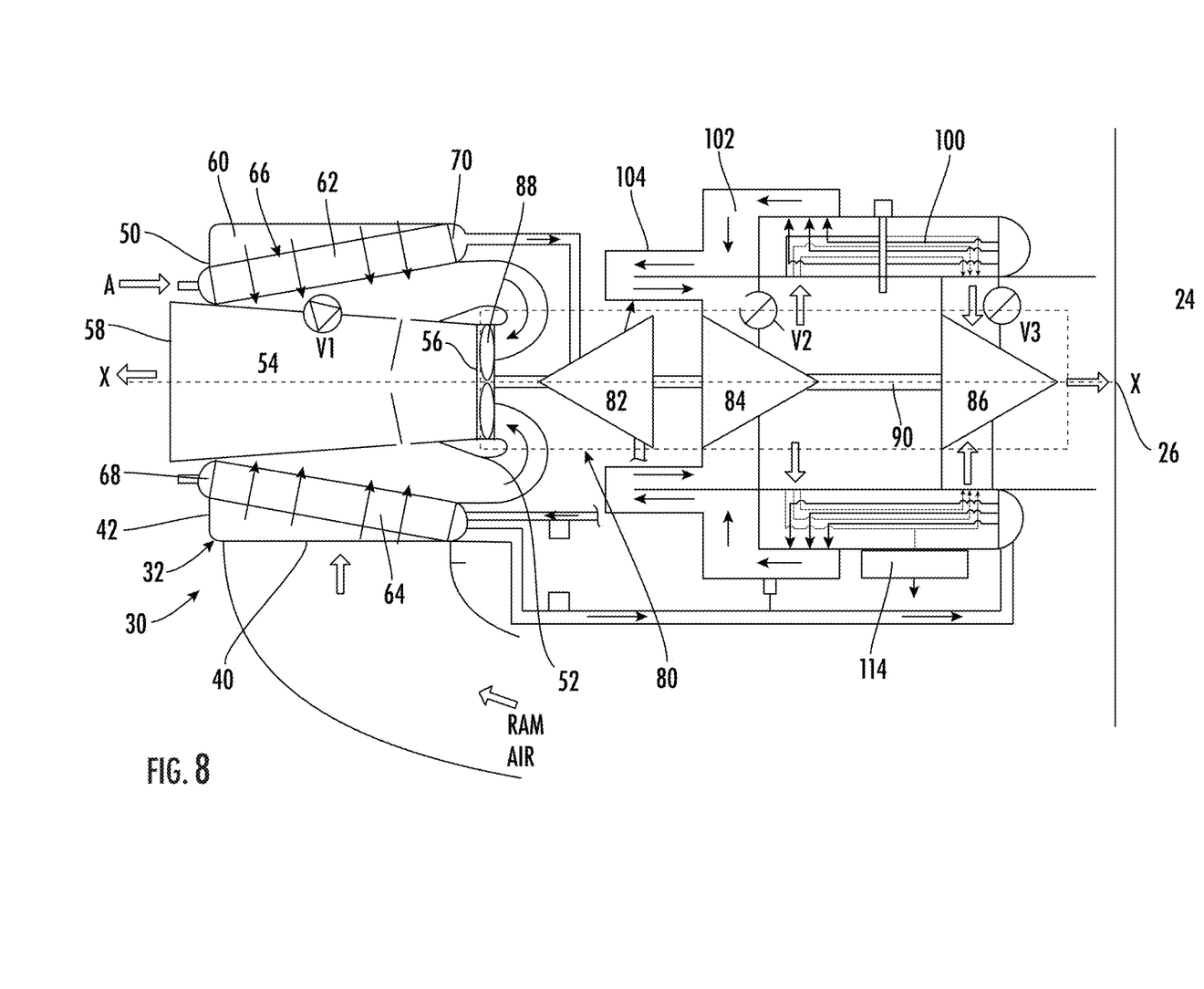
FIG. 8 is a schematic diagram of the environmental control system of FIG. 1 according to an embodiment.

As best shown in FIGS. 1 and 3, portions of the peripheries of the first sidewall 42 and the second sidewall 44 are connected to opposite sides of the outer wall 34. The first sidewall 42 has a first end 46 and the second sidewall 44 has a second end 48, respectively, that extend between the first edge 36 and the second edge 38 of the outer wall 34. Accordingly, the ends 46, 48 of the sidewalls 42, 44 cooperate with the first edge 36 and the second edge 38 to define the periphery of the inlet opening 40. Although the ends 46, 48, are illustrated as being straight and extending perpendicular to the first and second edges 36, 38, embodiments where one or both of the first and second end 46, 48 have another configuration are also within the scope of the disclosure. As best shown in FIGS. 2, 3, and 8, the first sidewall 42 includes a first aperture 50 and the second sidewall 44 includes a second aperture 52.

Similar to a ram air module, a center body, such as a diffuser and/or ejector 54 for example, may be arranged within the interior of the ram air duct 32 between the first sidewall 42 and the second sidewall 44. In an embodiment, a first end 56 of the diffuser/ejector 54 is located at the second aperture 52, such as at a center of the second aperture 52 for example. Further, as shown, the second end 58 of the diffuser/ejector 54 may extend through the first aperture 50 such that the second end 58 of the diffuser/ejector 54 is located external to the ram air duct 32. In the illustrated, non-limiting embodiment, the diffuser/ejector 54 is generally frustoconical in shape. In such embodiments, the diameter of the first end 56 of the diffuser/ejector 54 is smaller than the diameter at the second, opposite end 58 of the diffuser/ejector 54. However, it should be understood that embodiments where the first end 56 is larger in diameter than the second end 58 and embodiments where the diffuser/ejector 54 has another shape are also contemplated herein.

As best shown in the FIG. 8, the diffuser/ejector 54 divides the interior of the ram air duct 32 into a fan duct extending through the diffuser/ejector 54 and a plenum 60 arranged generally concentrically with the fan duct. In the illustrated embodiment, the flow of ram air provided to the plenum 60 may be a high-velocity airflow during flight.

The one or more heat exchangers of the ram air circuit are arranged within this plenum 60. As shown, the environmental control system 20 includes two heat exchangers, a primary heat exchanger 62 and a secondary heat exchanger 64, arranged within the plenum 60. However, it should be understood that embodiments of the environmental control system 20 having only a single heat exchanger, or alternatively, having three of more heat exchangers within the plenum 60 are also within the scope of the disclosure.

With reference to FIGS. 1-4, in the illustrated, non-limiting embodiment, each of the primary heat exchanger 62 and a secondary heat exchanger 64 is formed with a curvature generally complementary to the diffuser/ejector 54. As a result, the heat exchangers 62, 64 are configured to wrap about a portion of the periphery of the diffuser/ejector 54 over the length of the heat exchangers 62, 64. Although each heat exchanger 62, 64 is illustrated as wrapping about 180 degrees of the ejector periphery, a heat exchanger wrapping about any amount of the periphery of the diffuser/ejector 54, such as 360 degrees, 270 degrees, 135 degrees, 120 degrees, 90 degrees, 45 degrees, or 30 degrees for example, is also contemplated herein. Further, it should be understood that the configuration illustrated and described herein is intended as an example only and that embodiments where one or more of the heat exchangers 62, 64 has another configuration, such as a planar configuration, are also within the scope of the disclosure.

In embodiments where the ram air circuit 30 includes a plurality of heat exchangers, the plurality of heat exchangers 62, 64 may be separate components mounted within the plenum 60. Alternatively, the plurality of heat exchangers 62, 64 may be integrally formed. In the illustrated, non-limiting embodiment, the primary and secondary heat exchangers 62, 64 are integrally formed as a body 66 (see FIG. 4) having a frustoconical shape. As shown, each of the primary heat exchanger 62 and the secondary heat exchanger 64 wraps about 180 degrees of the periphery of the diffuser/ejector 54. Further, the body 66 may be oriented such that the entirety of the secondary heat exchanger 64 is positioned between the inlet opening 40 and the primary heat exchanger 62.

In such embodiments, the diameter of the body 66 positioned adjacent to the first sidewall 42 is smaller than the diameter of the body 66 located adjacent to the second sidewall 44. As a result, the radial clearance between the body 66 of the heat exchangers 62, 64 varies over the axial length of the diffuser/ejector 54. The clearance between the body 66 and the first end 56 of the diffuser/ejector 54 is larger than the clearance between the body 66 of the heat exchangers 62, 64 and the second end 58 of the diffuser/ejector 54. As will be described in more detail below, this clearance provides an air flow passage to an adjacent portion of the housing of the air cycle machine where the flow is turned toward the fan and exhausted overboard through the fan diffuser section. In an embodiment, a first end 68 the body 66 of the heat exchangers 62, 64 may be arranged in direct contact with the diffuser/ejector 54 at the first aperture 50 such that in combination, the diffuser/ejector 54 and the body 66 of the heat exchangers 62, 64 substantially seal the first aperture 50 relative to the flow within the plenum 60 of the ram air duct 32. As shown, a portion of the first end 68 of the body 66 may protrude beyond the first sidewall 42. Further, a second, opposite end 70 of the body 66 may be positioned directly adjacent to and/or in contact with the edge of the second sidewall 44 at the second aperture 52. In an embodiment, the second end 70 of the body extends through the second sidewall 44 and is arranged outside of the ram air duct 32.

The environmental control system 20 additionally includes one or more compression devices 80. In the illustrated, non-limiting embodiment, the compression device 80 is a mechanical device that includes components for performing thermodynamic work on a medium (e.g., extracts work from or applies work to the one or more mediums by raising and/or lowering pressure and by raising and/or lowering temperature). Examples of a compression device 80 include an air cycle machine, such as a two-wheel air cycle machine, a three-wheel air cycle machine, a four-wheel air cycle machine, etc.

In the non-limiting embodiment of FIGS., the compression device 80 is a four-wheel air cycle machine including a compressor 82, a plurality of turbines 84, 86, and a fan 88. The compressor 82 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc.

In the illustrated embodiment, the compression device 80 includes a first turbine 84 and a second turbine 86 operably coupled to each other and to the compressor 82 via a shaft 90. The shaft is rotatable about a second axis or shaft axis. The turbines 84, 86 are mechanical devices that expand a medium and extract work therefrom (also referred to as extracting energy) to drive the compressor 82 via the shaft 90. In embodiments including a plurality of turbines, the turbines 84, 86 may be operable independently or in combination, to drive the at least one compressor 82. However, embodiments where the compression device 80 includes no turbine, a single turbine, or more than two turbines are also contemplated herein.

The fan 88 is a mechanical device that can force a medium, such as ram air for example, via push or pull methods through the ram air duct 32 across the heat exchangers 62, 64 to control temperatures of the medium therein. Although the fan 88 is illustrated and described herein as being a part of the compression device 80, in other embodiments, the fan 88 may be separate from the compression device, and therefrom driven by another power source, such as an electric motor for example.

Figure 6:
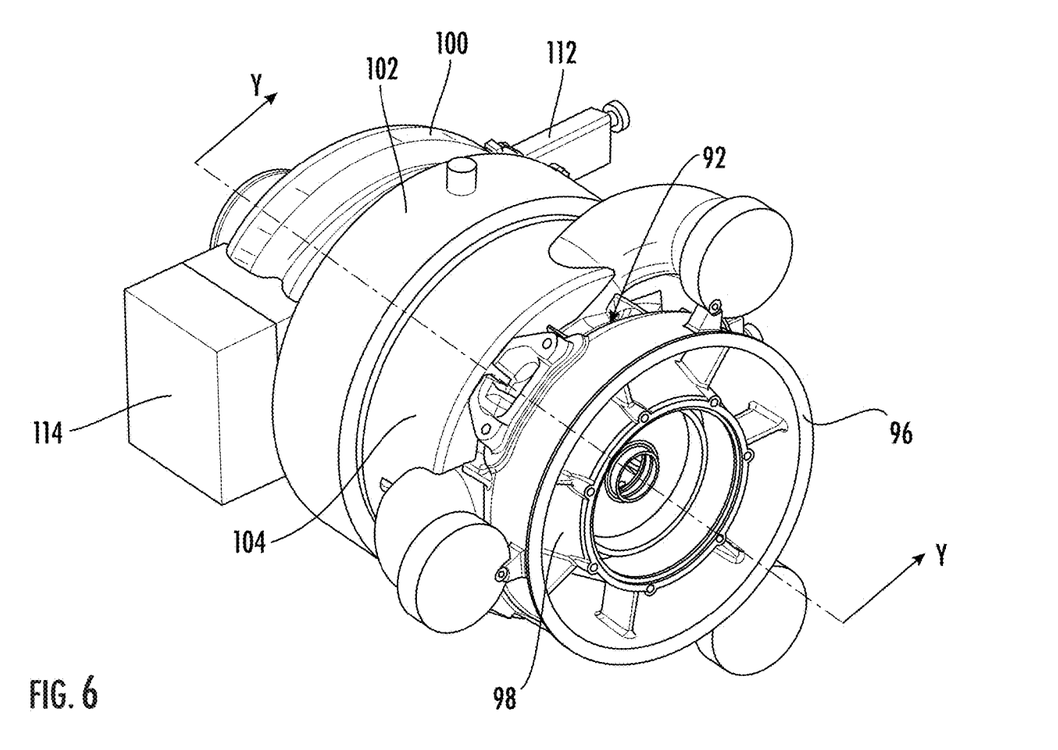
FIG. 6 is a perspective view of the portion of the environmental control system of FIG. 5 according to an embodiment.
Figure 7:
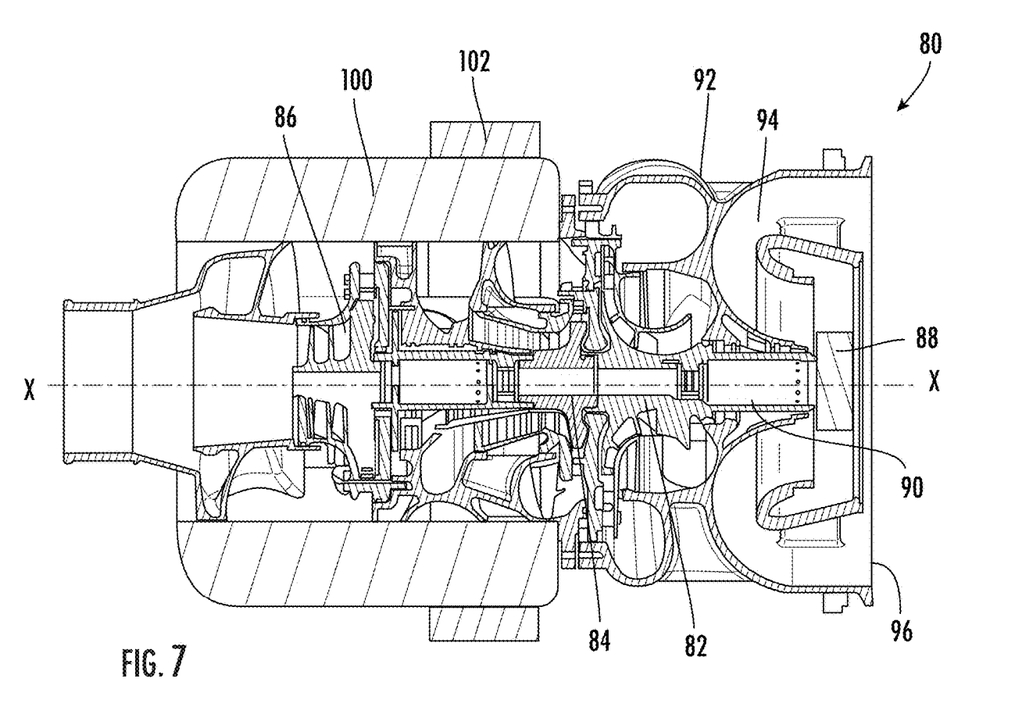
FIG. 7 is a cross-sectional view of the portion of the environmental control system of FIG. 6 taken along line Y-Y according to an embodiment.

In the illustrated, non-limiting embodiment, the axis of the shaft 90 of the compression device 80 is arranged coaxially with a central longitudinal axis of the diffuser/ejector 54. As a result, the diffuser/ejector 54 is axially aligned with the fan 88 on the central axis X. In an embodiment, best shown in FIGS. 6-8, the portion of the housing 92 of the compression device 80 surrounding the fan 88 includes a turnabout section 94 that is connectable to the ram air circuit 30 at a location adjacent to the second sidewall 44 of the ram air duct 32. With reference to FIG. 3, an annular ring 72 may be mounted to the interior surface of the body 66 of the heat exchangers 62, 64 in general alignment with the second sidewall 44. An end 96 of the housing 92 of the compression device 80 may have an outer diameter generally equal to the diameter of the annular ring 72. Further, a shroud 98 surrounding the fan 88 is arranged at a center of the housing 92 and has a diameter generally equal to the first end 56 of the diffuser/ejector 54. The end 96 of the housing 92 and the shroud 98 are connectable and sealable with both the annular ring 72 and the first end 56 of the diffuser/ejector 54 to define a fluid flow path extending from the plenum 60 and having a 180 degree turn to direct the fluid flow from the plenum 60 through the fan 88 and then into the fan duct of the diffuser/ejector 54. In the illustrated, non-limiting embodiment the turnabout section 94 has a hemi-toroidal shape; however, other suitable configurations of the turnabout section 94 are also within the scope of the disclosure.

The environmental control system 20 may additionally include a dehumidification system. In an embodiment, all or at least a portion of the dehumidification system is mounted concentrically with the compression device 80. As shown, the dehumidification system includes a condenser 100 and a water collector 102 arranged downstream from the condenser 100 relative to a flow of medium through the environmental control system 20. The water collector 102 may, but need not be located directly downstream from the condenser 100. However, a dehumidification system having another configuration is also contemplated herein. The condenser 100 is a particular type of heat exchanger and the water collector 102 is a mechanical device that performs a process of removing water from a medium.

In the illustrated, non-limiting embodiment, the condenser 100 is mounted concentrically with the compression device 80. Although the condenser 100 is illustrated as being cylindrical or annular in shape, it should be understood that in other embodiments, the condenser 100 may wrap about only a portion of the periphery of the compression device 80. Further, the condenser 100 may be integrally formed with a portion of the compression device 80, such as with the housing 92 of the compression device 80 for example, or alternatively, may be a separate component mounted about the exterior of the compression device 80. In an embodiment, the condenser 100 axially overlaps with at least a portion of one or more of the components of the compression device 80, such as the first turbine 84 and the second turbine 86 for example. However, embodiments where the condenser 100 is arranged at another axial position relative to the compression device 80 are also within the scope of the disclosure.

The condenser 100 may have any suitable construction including but not limited to shell and tube, plate, plate and shell, adiabatic wheel, plate fin, pillow plate. One or more of the flows provided to the condenser 100 is configured to travel parallel to the rotational axis X of the compression device 80. In the illustrated, non-limiting embodiment, the condenser 100 is configured as a counterflow heat exchanger such that both a first flow of medium and a second flow of medium is configured to flow through an interior of the heat exchanger, parallel to the axis X of the compression device 80. However, embodiments where one of more of the flows of medium within the condenser 100 is configured to flow in a direction about the circumference of the compression device 80 or in another direction that is not parallel to the axis X are also contemplated herein.

Alternatively, or in addition, the water collector 102 may be mounted concentrically with the compression device 80. As shown, the water collector 102 is located directly downstream from the outlet of the condenser 100. In such embodiments, the water collector 102 may be integrally formed with the housing 92 of the compression device 80, integrally formed with the condenser 100, or may be a separate component mounted about the exterior of the compression device 80. Further, as noted above with respect to the condenser 100, the water collector 102 may be cylindrical in shape, or alternatively, may extend or wrap about only a portion of the periphery of the compression device 80.

In the illustrated, non-limiting embodiment of FIG. 8, the dehumidification system further includes a preheater 104 within which heat is transferred to the medium flowing through the interior of the preheater 104. As shown, the preheater 104 may be located directly downstream from the water collector 102 relative to the flow of medium passing through the dehumidification system such that the cool dry medium output from the water collector 102 is heated therein. Further, the preheater 104 may be mounted concentrically with a portion of the compression device 80. In the illustrated, non-limiting embodiment, the preheater 104 is mounted concentrically about the exterior of the compression device 80 at a position axially aligned with at least a portion of the compressor 82. By positioning the preheater 104 directly adjacent to the compressor 82, the heat generated within the compressor 82 may be used to heat the medium within the preheater 104. The preheater 104 may be integrally formed with one or more of the housing 92 of the compression device 80, the water collector 102, and the condenser 100, or may be a separate component mounted about the compression device 80.

In an embodiment, best shown in FIG. 3, the assembled ram air circuit 30 of the environmental control system 20 may be considered a first module, and the assembled compression device and dehumidification system, in combination, is a second module. The first module and the second module are easily connectable to one another to form the environmental control system 20. For example, one or more of the conduits extending from the ram air module may be coupled to conduits associated with one or more inlets or outlets of the compression device 80 or dehumidification system. Further, in an embodiment, the outer diameter of the second module, defined by the outer periphery of the dehumidification system for example, is equal to or less than an inner diameter of the body 66 of the heat exchangers 62, 64. However, embodiments where the diameter of the second module is greater than the inner diameter of the body 66 of the heat exchangers 62, 64 is also within the scope of the disclosure.

The elements of the environmental control system 20 are connected via valves, tubes, pipes, and the like. Valves (e.g., flow regulation devices or mass flow valves) are devices that regulate, direct, and/or control a flow of a medium by opening, closing, or partially obstructing various passageways within the tubes, pipes, etc. of the environmental control system 20. Valves can be operated by actuators, such that flow rates of the medium in any portion of the environmental control system 20 can be regulated to a desired value. In an embodiment, a fan bypass valve V1 is operable to allow air within the plenum to bypass the fan 88. The environmental control system 20 may further include at least one valve operable to allow a flow to bypass a respective component of the compression device 80. In the illustrated, non-limiting embodiment, a first bypass valve V2 is associated with the first turbine 84 and a second bypass valve V3 is associated with the second turbine 86. However, it should be understood that a system only having a single bypass valve and/or a system having a bypass valve associated with the compressor 82 are also contemplated herein.

Figure 9A:
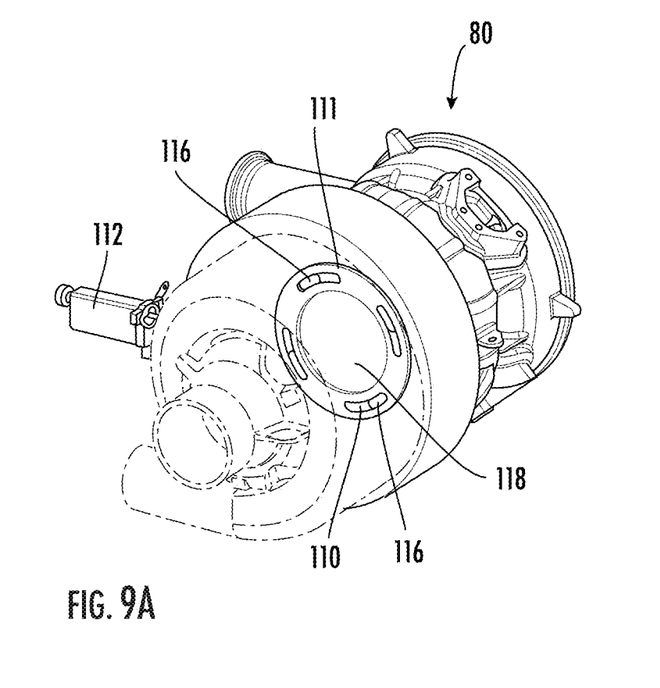
FIGS. 9A and 9B are perspective view of a valve of the environmental control system according to an embodiment.
Figure 9B:
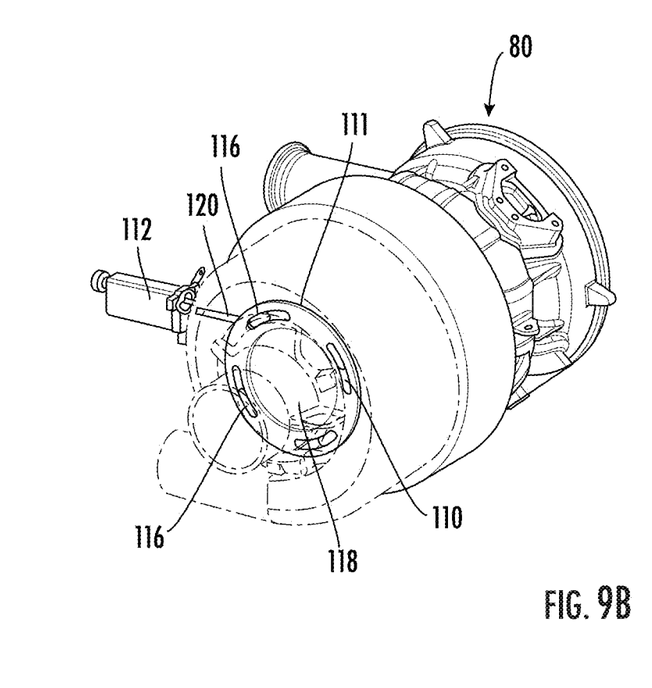

With continued reference to FIG. 8 and further reference to FIGS. 9A-9B, as shown, the first and second bypass valves V2, V3 each include a movable member 110 mounted at an exterior of interior of the compression device 80 and an actuator 112 mounted adjacent to an exterior of the compression device 80. In embodiments where all or a portion of the dehumidification system is mounted concentrically with the compression device 80, the actuators 112 may also be located external to the concentric components of the dehumidification system. A controller 114 configured to provide commands to the actuators 112 and other electronic components (not shown) associated with the environmental control system 20 is also mounted at an exterior of the environmental control system 20. In the illustrated, non-limiting embodiment, the controller 114 is mounted concentrically with the compression device 80, and more specifically, at or adjacent to an exterior surface of the condenser 100.

As shown in FIGS. 9A and 9B, in an embodiment, the bypass valves V2 and V3 additionally includes a stationary member 111 having an annular or ring-like shape. The plate 111 has one or more slots 116 formed therein and is mounted concentrically with the axis X of the shaft 90. In an embodiment, the opening 118 formed at the center of the stationary member 111 may be sufficiently sized to position the stationary member 111 at a location between the inlet and the outlet of the first and/or second turbine 84, 86. A drive shaft 120 of the actuator 112 is connected to a portion of the movable member 110 and is driven by the actuator 112 to adjust the position of the movable member 110 relative to the stationary member 111. This movement of the movable member 110 will selectively open and close flow paths via the slots 116 that bypass an adjacent component, such as one of the turbines 84, 86. The configuration of the valves V2-V3 illustrated and described herein is intended as an example only and a valve having any suitable configuration is contemplated herein.

During normal operation of the environmental control system 20, a pressurized medium A, such as bleed air drawn from an engine or APU for example, is provided to the ram air circuit 30. Specifically, the hot, high pressure medium is provided to the first or primary heat exchanger 62 where the medium A is cooled by another medium, such as ram air for example. The ram air is driven by the fan through the plenum 60 across the heat exchangers 62, 64. The heated ram air is then diverted into the turnabout section 94 of the housing 92 and passed through the fan into the fan duct within the interior of the diffuser/ejector 54. From the primary heat exchanger 62, the medium A flows to the inlet of the compressor 82 of the compression device 80. The act of compressing the medium A heats and increases the pressure of the medium A.

The medium A output from the compressor 82 is returned to the ram air circuit 30. As shown, the medium A is delivered to the secondary heat exchanger 64 where the medium is again cooled by the flow of ram air. The medium A exiting the secondary heat exchanger 64 is then provided to the downstream dehumidification system. In the illustrated, non-limiting embodiment, the medium A is provided to the condenser 100, the water collector 102, and the preheater 104 in series. As shown, the inlet of the condenser 100 may be arranged near a far end of the compression device 80, distal to the ram air circuit 30. Within the condenser 100, the flow of medium A is further cooled causing any moisture therein to condense into a liquid. This free moisture is removed within the water collector 102 to produce a cool, high pressure medium A.

This cool, pressurized medium A is then provided to the preheater 104, in which the medium A is heated before being provided to a turbine of the compression device 80. In embodiments of the environmental control system 20 where both of the turbines 84, 86 are utilized, the first and second turbines 84, 86 may be arranged in series relative to the flow of medium. Within the first turbine 84, work is extracted from the medium A to drive the compressor 82 and the fan 88 via rotation of the shaft 90. From the outlet of the first turbine 84, the flow of medium A may be returned to the condenser 100 to form the second flow of medium therein. The second flow of the medium A within the condenser absorbs heat from the first flow of the medium A before being provided to the inlet of the second turbine 86. However, it should be understood that embodiments where the medium A is provided directly from the first turbine 84 to the second turbine 86 are also contemplated herein. Within the second turbine 86, additional work is extracted from the medium A. The flow of medium A having a reduced pressure and temperature is then provided to the one or more loads of the vehicle, such as the volume 24 for example via the outlet 26.

It should be understood that the environmental control system 20 may be operable in a plurality of modes, selectable based on a flight condition of the aircraft. The environmental control system 20 may be operable in a first, low altitude mode or a second, high altitude mode. The first, low altitude and subsonic mode is typically used for ground and low altitude flight conditions, such as ground idle, taxi, take-off, hold, descent. and subsonic cruise conditions, and the second, high altitude mode may be used at climb and high altitude supersonic cruise flight conditions. The condition (open, closed, partially open . . . etc.) of the one or more valves V1-V3, and therefore the flow path of the medium through the environmental control system 20, may vary based on the mode of operation of the system. In an embodiment, the medium is configured to flow through both turbines 84, 86 in series when the aircraft is in a ground or low altitude mode of operation. However, the medium may be configured to bypass one of the turbines 84, 86 when the aircraft is in a high altitude flight condition. In such embodiments, valve V2 may be open and used to regulate the temperature of the pass of cool medium provided to the condenser 100 to above freezing.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system comprising:
 a ram air circuit including:
  a ram air duct, the ram air duct being curved about a ram axis;
  a diffuser arranged within the ram air duct, the diffuser having a frustoconical shape;
  and at least one heat exchanger arranged within the ram air duct radially outward of the diffuser; and
 a compression device including a compressor and at least one turbine operably coupled by a shaft rotatable about a shaft axis;

wherein the ram axis is arranged coaxially with the shaft axis.

2. The environmental control system of claim 1, wherein the ram air duct has a scroll-shaped outer wall that is curved about the ram axis.

3. The environmental control system of claim 1, wherein a portion of the ram air duct is directly connected to the compression device.

4. The environmental control system of claim 1, wherein the ram air circuit further comprises a diffuser/ejector arranged within the ram air duct, wherein a plenum is defined between an exterior of the diffuser/ejector and an interior of the ram air duct and the at least one heat exchanger is arranged within the plenum.

5. The environmental control system of claim 4, wherein the diffuser/ejector extends external to the ram air duct.

6. The environmental control system of claim 4, wherein the at least one heat exchanger extends external to the ram air duct.

7. The environmental control system of claim 4, wherein a diameter of the diffuser/ejector increases along a fluid flow path defined by an interior of the ejector.

8. The environmental control system of claim 4, wherein the at least one heat exchanger is mounted concentrically about at least a portion of the ejector.

9. The environmental control system of claim 4, wherein a radial clearance between the diffuser/ejector and the at least one heat exchanger varies over an axial length of the ejector.

10. The environmental control system of claim 4, wherein the environmental control system further comprises a fan fluidly coupled to the plenum and to the ejector.

11. The environmental control system of claim 10, wherein the fan is mounted to the shaft of the compression device.

12. The environmental control system of claim 11, wherein the compression device includes a housing, an end of the housing being connectable to the ram air circuit such that a portion of the housing surrounding the fan defines a turnabout section fluidly connecting the plenum and the fan.

13. The environmental control system of claim 12, wherein the housing includes a shroud surrounding the fan, the shroud being connectable to an end of the ejector.

14. The environmental control system of claim 1, further comprising a dehumidification system including a condenser and a water collector.

15. The environmental control system of claim 14, wherein a portion of the dehumidification system is mounted concentrically about the compression device.

16. The environmental control system of claim 15, wherein the portion of the dehumidification system is integrally formed with the compression device.

17. An environmental control system comprising:
a first module including an inlet and a ram air circuit, the first module being oriented about a first axis; and
a second module including an outlet, a dehumidification system, and a compression device, the dehumidification system being arranged concentrically about the compression device, the second module defining a second axis;
wherein the first module and the second module are connectable to define a fluid flow path extending between the inlet and the outlet, wherein when the first module and the second module are connected, the first axis and the second axis are coaxial.

18. The environmental control system of claim 17, wherein the ram air circuit includes a heat exchanger, and an outer diameter of the second module is generally equal to or less than an inner diameter of the heat exchanger.

19. An environmental control system comprising:
a ram air circuit including:
a ram air duct and at least one heat exchanger arranged within the ram air duct, the ram air duct being curved about a ram axis; and
a compression device including a compressor and at least one turbine operably coupled by a shaft rotatable about a shaft axis, wherein the ram axis is arranged coaxially with the shaft axis; and
a dehumidification system fluidly coupled to the compression device, at least a portion of the dehumidification system being mounted concentrically about the compression device.

* * * * *